July 13, 1937.  C. McCURLEY  2,086,776
TIRE COVER FOR SPARE TIRES
Filed July 13, 1931  4 Sheets-Sheet 1
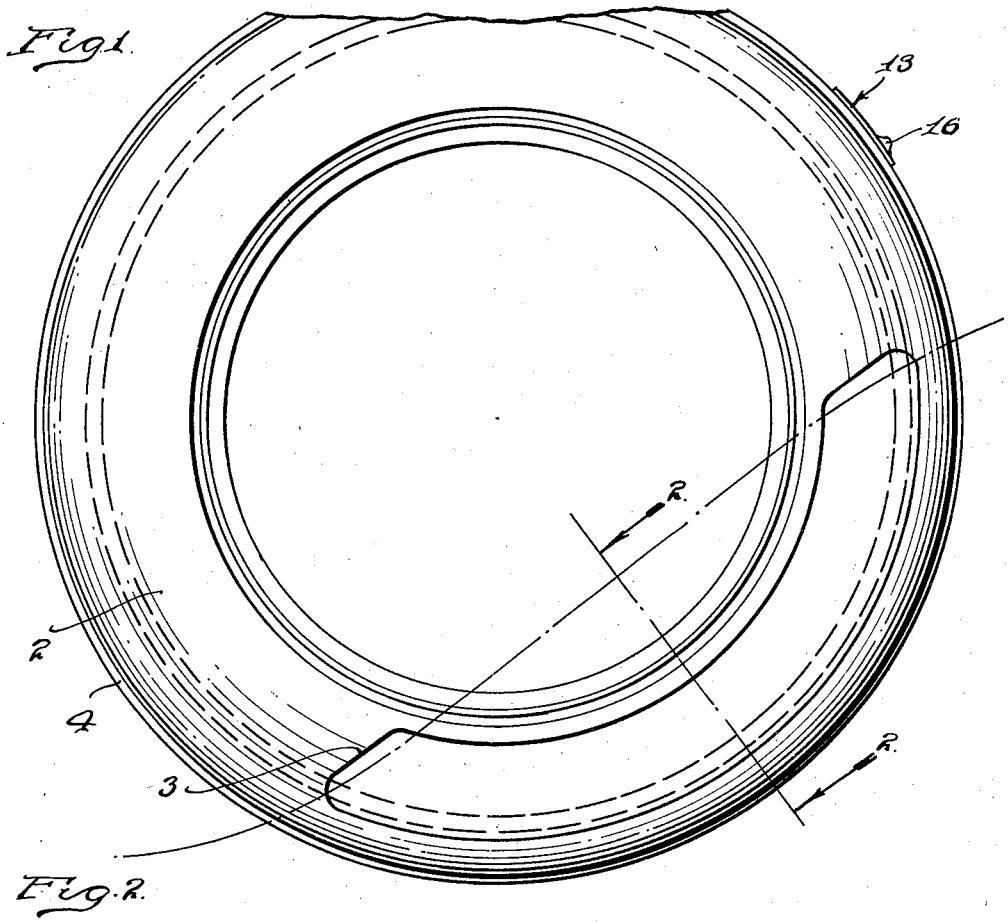
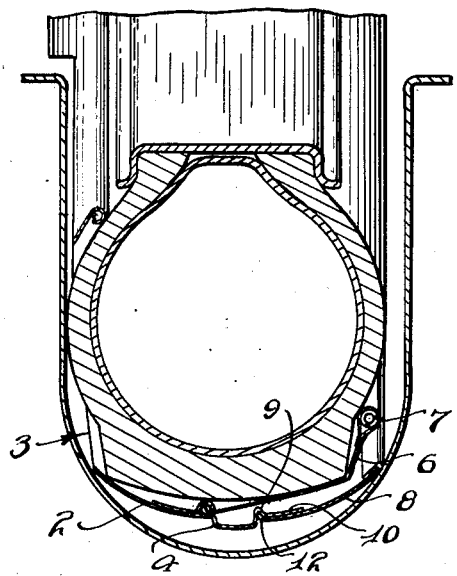
INVENTOR.
CHARLES McCURLEY.
BY
Barnes + Kisselle
ATTORNEYS July 13, 1937.  C. McCURLEY  2,086,776
TIRE COVER FOR SPARE TIRES
Filed July 13, 1931    4 Sheets-Sheet 2
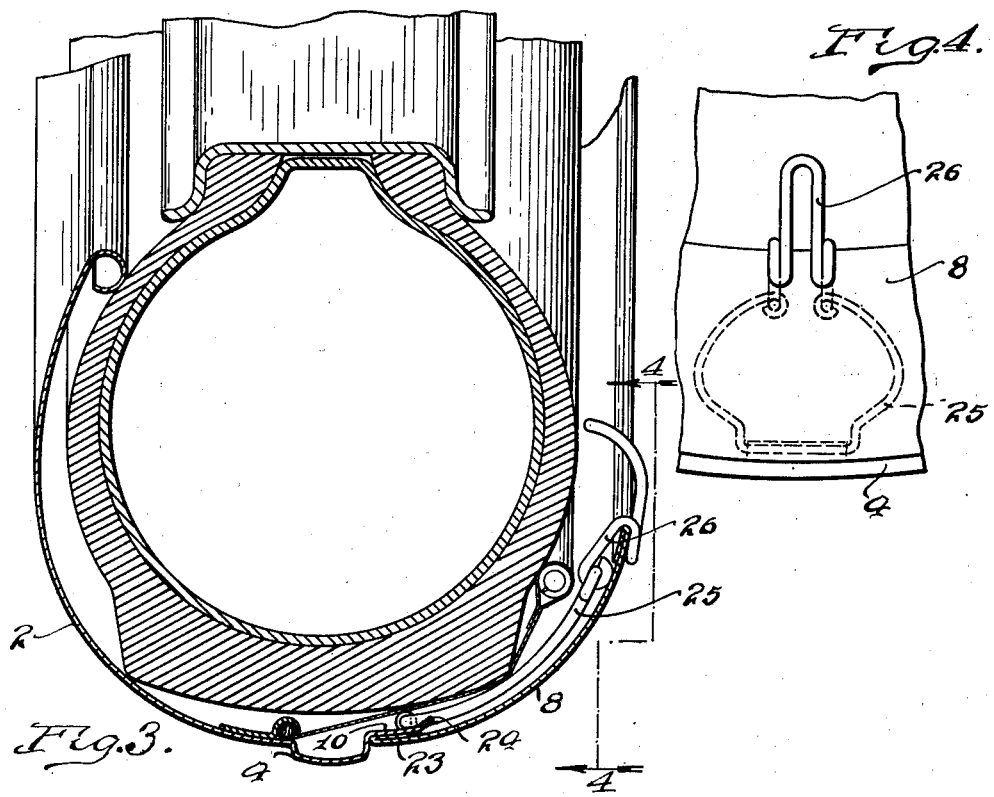
INVENTOR.
CHARLES McCURLEY.
BY
Barnes & Kissell
ATTORNEYS July 13, 1937.   C. McCURLEY   2,086,776
TIRE COVER FOR SPARE TIRES
Filed July 13, 1931   4 Sheets-Sheet 3
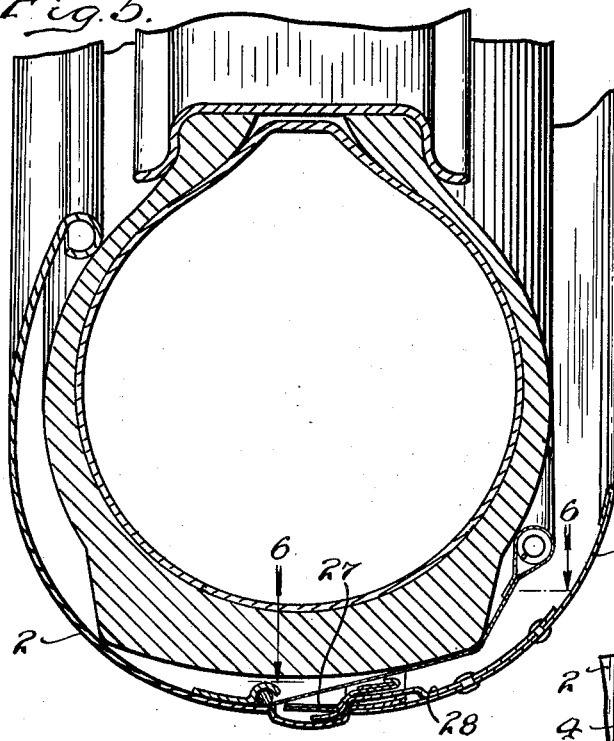
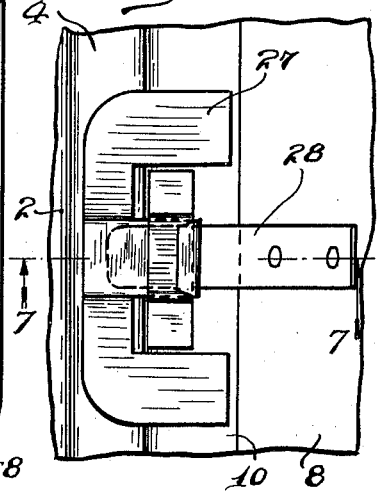
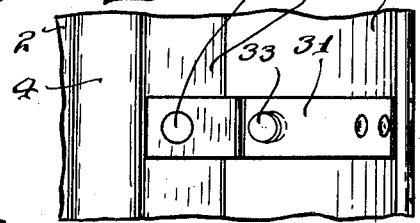
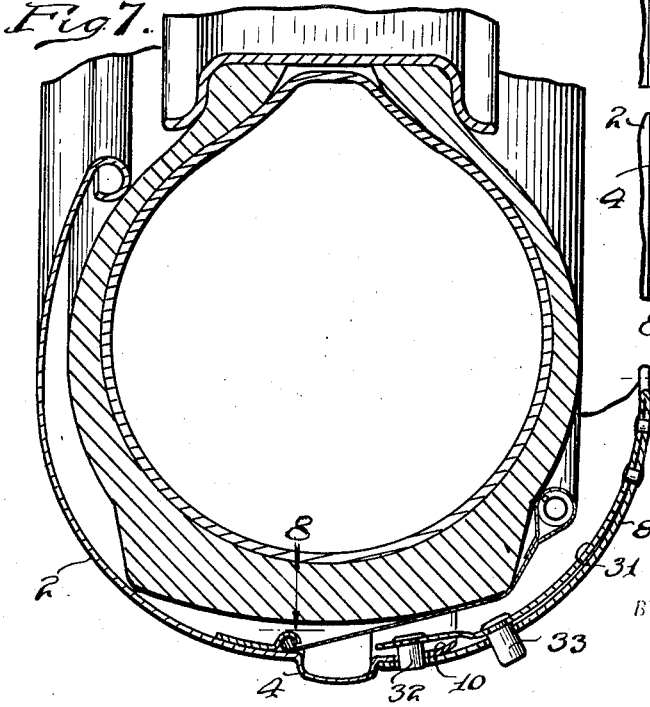
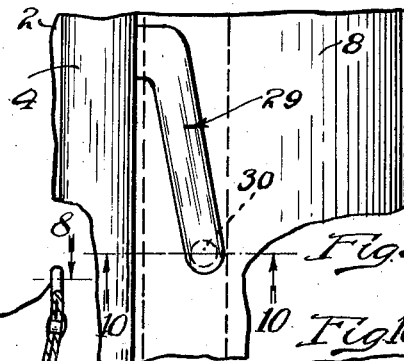
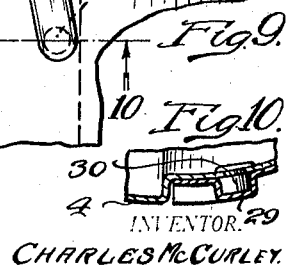
INVENTOR.
CHARLES McCURLEY.
BY
Barnes & Kissell
ATTORNEYS

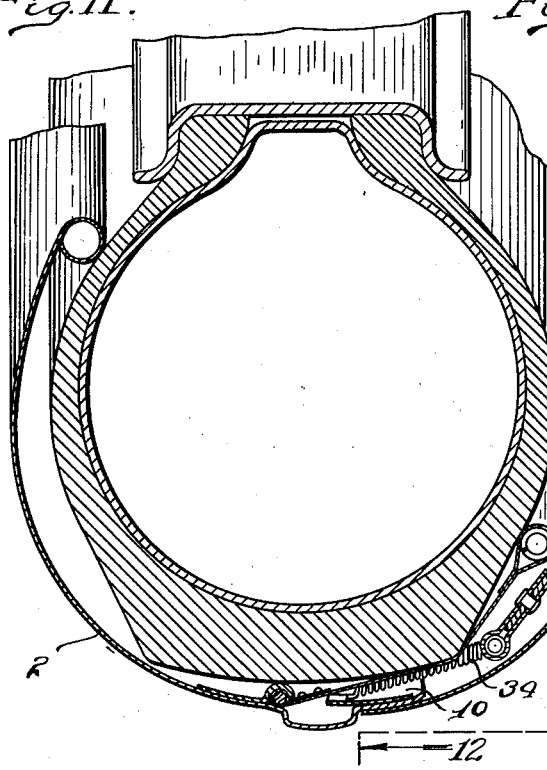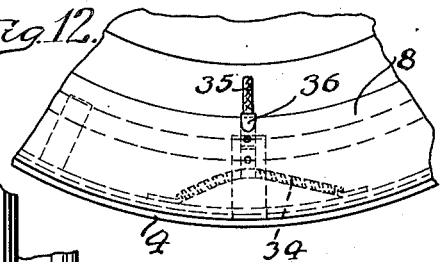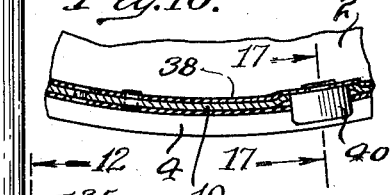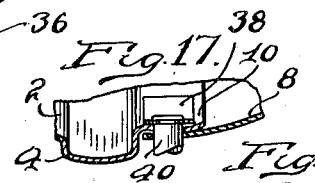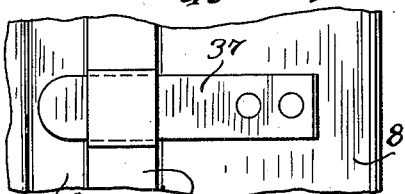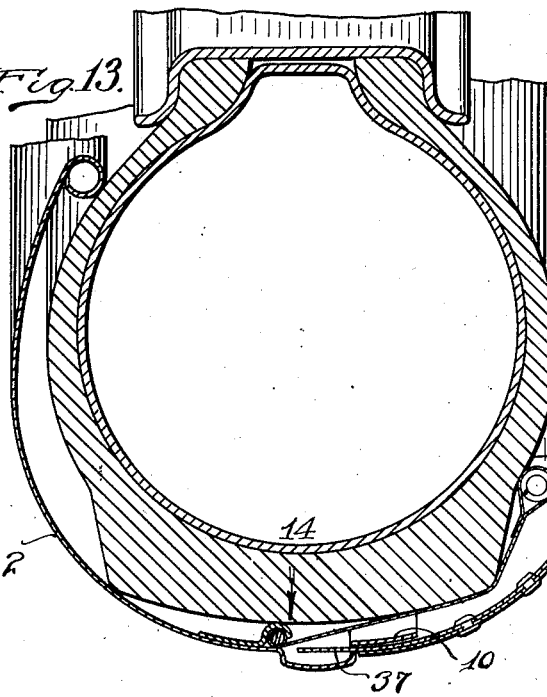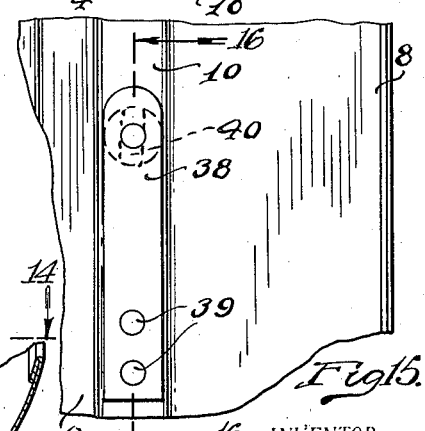

Patented July 13, 1937

2,086,776

UNITED STATES PATENT OFFICE 2,086,776

TIRE COVER FOR SPARE TIRES

Charles McCurley, Detroit, Mich., assignor to Clayton and Lambert Manufacturing Company, Detroit, Mich., a corporation of Delaware Application July 13, 1931, Serial No. 550,368

13 Claims. (Cl. 150—54)

This invention relates to tire covers for spare tires, and particularly to metal tire covers of the type adapted to cover the face and periphery of the tire.

The present invention constitutes an improvement over the type of tire cover having a rigid, preferably metallic cover covering the face and periphery of the tire and means carried by the rigid cover and extending around and engaging a portion of the rear of the tire whereby to hold the cover securely in place and against rattling. More specifically, the present invention contemplates a cover extension adapted to be easily secured to and carried by the rigid part of the tire cover, said extension being annular in shape and arcuate in cross section so as to continue the general contour of the rigid cover and cover up the means carried by the main part of the cover for securing the same to the tire. When spare tires having covers of this type are placed in fender wells, the attaching means whether it be fabric or other material and other means is distinctly visible by the occupants of the car and therefore making a rather unsightly appearance. By providing the annular extension to complete the contour of the main rigid cover, the attaching means are completely concealed from the view of the occupants of the car thus presenting a tire cover having all the benefits of a complete metal enclosure and which at the same time is secured to the tire by simple attaching means carried by the rigid part of the cover.

In the drawings:

Fig. 1 is a side elevation of a cover embodying the present invention and showing in dotted lines the position the fender assumes relative to the cover when the tire is placed in a fender well.

Fig. 2 is a sectional view taken on line 2—2 of Fig. 1 illustrating the manner of cutting away one portion of my novel tire cover whereby the same may be positioned in a narrow fender well.

Fig. 3 is a sectional view illustrating the embodiment of an expansible clip device for holding the cover extension in place.

Fig. 4 is a fragmentary exterior view of the clip structure shown in Fig. 3.

Figs. 5 and 6 are sectional and fragmentary views, respectively, of a modification of the attaching means between the main tire cover unit and the extension cover.

Figs. 7 and 8 represent sectional and fragmentary views of a further modified form of connection between the main tire cover and cover extension.

Figs. 9 and 10 represent a further modification embodying a bayonet slot connection between the main cover unit and the cover extension.

Figs. 11 and 12 are sectional and fragmentary views of modified connecting means in the form of resilient means for attaching and holding the cover extension to a part of the main tire cover.

Figs. 13 to 17 illustrate further modifications in the structure positioning and connecting means between the cover extension and the main tire cover.

The present invention is directed particularly to that type of tire cover consisting of an integral annular piece of metal, arcuate in cross section, and covering the face and a portion of the periphery. In Fig. 1, I have shown an annular piece of stamped or rolled sheet metal 2 which is preferably imperforate except for a cut away portion 3 which is so cut away to permit the tire and cover to be placed in certain narrow fender wells, as shown in Fig. 2.

The continuous cover member 2 may terminate at various points relative to the periphery of the tire, but as best shown in Fig. 2, the member 2 terminates in an annular bead 4 at about the central portion of the periphery of the tire and secured to the middle portion 2 as at 5 is an annular fabric cover unit 6, the outer edge of which is provided with an annular spring member. So much of this structure is generally old as set forth in the patent of Carl C. Krebs, 1,933,268, dated October 31, 1933. The annular spring 7 normally contacts with the rear face of the tire and maintains the face member 1 in covering position relative to the face of the tire. In removing and replacing the tire, the fabric cover 6 and its coil spring 7 is folded back around the periphery of the cover member 2.

In a tire cover of this type the members 6 and 7 form what might be termed the attaching means for the ornamental portion 2 of the tire cover. In order to cover up this attaching means, which because of its very nature is more or less unsightly, I have provided a metallic cover extension 8. This cover extension is arcuate in cross section and in its general arcuate form, the portion of the main cover member 2 adjacent the inner side of the bead 4 is provided with an inturned bead or ridge 9, terminating in a flange 10.

The inner annular edge of the split extension 8 may be turned in as at 12 to complementally fit within the groove formed by the bead 9. The forming of the air space around the tire is an important feature of the present invention for the reason that when a metal tire cover contacts with a material surface of the tire, and such tire cover is subjected to the hot sun, this often results in sticking of the metal tire cover to the surface of the tire and the tearing away of a portion of the rubber. By providing the air spaced between the metal tire cover and the tire, such tendency to stick to the tire is eliminated.

Figs. 3 and 4 illustrate the preferred embodiment of my invention wherein the outer annular edge of the extension rim 8 is turned over as at 23 and the inner edge 24 of the flange 10 is bent inwardly so that in assembling the extension rim the entire rim may be shoved into place and up against the edge of the annular bead 4. Instead of splitting the cover extension 8 and using an expansion or contraction member, I preferably provide a plurality of spring members 25 which may be secured to the inner face of the flange 10 and which terminate in a clip member 26. Thus the rim 8 may be of complete annular formation instead of being split and when assembled over the edge of the flange 10 the clip members 26 may be grasped by the operator and the spring members distorted until such clip fits over the rim member 8 as best shown in Fig. 3. In this case resilient means is provided for holding a continuous rim member in position.

A further modification of the invention is illustrated in Figs. 5 and 6 in which case a solid annular rim member 8 similar to the rim member shown in Fig. 3 but wherein the sole means for holding the rim member 8 in position consists of a resilient yoke member 27 secured to and spaced circumferentially around the inner flange of the main cover member 2, each yoke member providing an opening for receiving spring pressed lugs 28 secured to the rim member 8. The ends of the lug members 28 may be initially positioned in the openings formed by the yoke members 27 and the entire rim pushed "home" so that the lug members 28 resiliently engage the yokes 27 to maintain the rim 8 in position.

In the modification shown in Figs. 7, 8, 9 and 10, the rim 8 is solid and adapted to be secured to the flange 10 by means of bayonet slots 29 formed in and spaced around the periphery of the extension cover 8, said bayonet slots cooperating with suitable pins 30 carried by the flange 10. In order to hold the extension 8 in the position shown in Fig. 9, a resilient spring member 31 is carried by the rim 8 and is provided with a member 32 for cooperating with the flange 10 and a member 33 adapted to be pressed inwardly by the hand to release the spring member 31.

The modification illustrated in Figs. 11 and 12 is similar to the modification illustrated in Figs. 3 and 4 with the exception that coil springs 34 are secured to the flange 10 and are provided with a suitable strap member 35 and hook 36 to permit the same to be easily grasped by the hand and hooked around the periphery of the solid rim 8.

In the modification illustrated in Figs. 13 to 17, a plain lug 37 is adapted to initially position the rim 8 relative to the main cover. Positioned inside of the flange 10 and circumferentially spaced around the same are spring members 38 secured to the flange 10 as at 39 and provided with a pin 40 adapted to protrude through suitably shaped apertures in the periphery of the rim 8. The outer exposed surfaces of the pins 40 are preferably shaped to provide a cam surface cooperating with the edge of the rim 8 whereby such rim will snap into place over the pins 40 as it is pushed "home" after the member 37 has been located in the flange 10. The resiliency of the members 38 permits the pins 40 to be easily depressed by the rim during assembly and by the fingers when it is desired to remove the rim.

What I claim is:

1. A sheet metal tire cover comprising a circular front cover member for covering the front face and a portion of the periphery of the tire, a circular rear cover member for covering the remainder of the periphery, interfitting edges on said cover members, and extensible and contractible clip members carried by and spaced around one of said cover members, said clip members being bodily movable relative to and extending transversely of the cover and the ends thereof being shaped when the clip members are extended to grasp and fit around an inner edge of the other cover member whereby to hold the same in assembled relation with the cover member carrying the clips when said clip members are contracted.

2. A sheet metal tire cover comprising a circular front cover member for covering the front face and a portion of the periphery of the tire and terminating adjacent the median plane of the tire, a circular rear cover member for covering the remainder of the periphery, interfitting edges on said cover members, and permanently assembled, longitudinally extensible and contractible clip members carried by and spaced around one of said cover members, said clip members extending transversely of the cover and the ends thereof being shaped to grasp and fit around an edge of the other member spaced from said interfitting edges whereby to hold the same in assembled relation with the cover member carrying the clips when said clip members are contracted.

3. A sheet metal tire cover comprising a circular cover member for covering the front face and a portion of the periphery of the tire, a circular cover member for covering the remainder of the periphery and a portion of the rear face of the tire, interfitting edges on said cover members, and extensible and contractible clip members carried by and spaced around the front cover member, said clip members being bodily movable relative to and extending transversely of the cover and the ends thereof being shaped to grasp and fit around an inner edge of the other member whereby to hold the same in assembled relation with the cover member carrying the clips.

4. A sheet metal tire cover comprising a circular front cover member for covering the front face and a portion of the periphery of the tire, a circular rear cover member for covering the remainder of the periphery, interfitting axially slidable edge portions on said cover members, and resilient clip members spaced around and so mounted on the front cover member as to permit bodily movement relative thereto, said clip members extending transversely of the cover and the ends thereof being shaped to grasp and fit around an inner edge of the rear member whereby to hold the same in assembled relation with the front cover member.

5. A sheet metal tire cover comprising a circular front cover member for covering the front face and a portion of the periphery of the tire, a circular rear cover member for covering the remainder of the periphery, interfitting edges on said cover members, and longitudinally resilient clip members carried by and spaced around the front cover member, said clip members extending transversely of the cover and the ends thereof being shaped to grasp and fit around an inner edge of the rear member whereby to hold the same in assembled relation with the front cover member.

6. A sheet metal tire cover comprising a circular cover member for covering the front face and a portion of the periphery of the tire and terminating adjacent the median plane of the tire, a circular cover member for covering the remainder of the periphery and a portion of the rear face of the tire, interfitting edges on said cover members, and extensible and contractible resilient acting clip members carried by and spaced around one of said cover members, said clip members extending transversely of the cover and the ends thereof being shaped to grasp and fit around an inner edge of the other member whereby to hold the same in assembled relation with the cover member carrying said clip members.

7. A sheet metal tire cover comprising a circular cover member for covering the front face and a portion of the periphery of the tire, a circular cover member for covering the remainder of the periphery, interfitting axially slidable edge portions on said cover members, and longitudinally extensible and contractible clip members each having one end mounted on one of said covers for bodily movement relative thereto, said clip members extending transversely of the cover and the ends thereof being shaped to grasp and fit around an edge of the other member whereby to hold said cover members in assembled relation.

8. A sheet metal tire cover comprising a circular front cover member for covering the front face and a portion of the periphery of the tire and terminating adjacent the median plane of the tire, a circular rear cover member for covering the remainder of the periphery and a portion of the rear face of the tire, interfitting axially slidable edge portions on said cover members, and extensible and contractible resilient clip members carried by and spaced around the front cover member, said clip members extending transversely of the cover and the ends thereof being shaped to grasp and fit around an edge of the rear member whereby to hold the same in assembled relation with the front cover member.

9. A sheet metal tire cover comprising a circular front cover member for covering the front face and a portion of the periphery of the tire and terminating adjacent the median plane of the tire, a circular rear cover member for covering the remainder of the periphery, interfitting axially slidable edge portions on said cover members, and longitudinally resilient clip members carried by and spaced around the front cover member, said clip members extending transversely of the cover and the ends thereof being shaped to grasp and fit around an edge of the rear member whereby to hold the same in assembled relation with the front cover member.

10. A sheet metal tire cover comprising a circular front cover member for covering the front face and a portion of the periphery of the tire and terminating adjacent the median plane of the tire, a circular rear cover member for covering the remainder of the periphery and a portion of the rear face of the tire, interfitting edges on said cover members, and longitudinally extensible and contractible resilient acting clip members carried by and spaced around the front cover member, said clip members extending transversely of the cover and the ends thereof being shaped to grasp and fit around an edge of the rear member whereby to hold the same in assembled relation with the front cover member.

11. A tire cover comprising an annular metallic member for covering a portion of a face and a portion of the periphery up to approximately the median plane of the tire, a second annular metallic member covering a portion of the opposite face of the tire and a portion of the periphery, said members having inner edge portions axially and slidably cooperating with each other at substantially the median plane of the tire, and resilient fastening means circumferentially spaced around and secured to the inside of one of said metallic cover members and cooperating with portions of the other cover member to resiliently hold the second annular metallic member in assembled relation with the first named metallic cover member.

12. In tire protectors, two ring shaped covers each adapted to surround a portion of the tire, and meeting each other at the tread thereof, a spring attached to one of said covers, a hook adapted to engage the inner edge of the other of said covers and means to connect said hook to said spring.

13. In tire protectors, two ring shaped covers each adapted to surround a portion of the tire, and meeting each other at the tread thereof, a spring attached to one of said covers, a link connected to said spring and extending transversely from the inner edge of the last mentioned cover, and means to releasably connect said link to the other of said covers to hold the same in assembled relation with the cover carrying the spring.

CHARLES McCURLEY.